United States Patent [19]

Kodama et al.

[11] 4,144,413
[45] Mar. 13, 1979

[54] ROTARY TELEPHONE DIAL

[75] Inventors: Tadashi Kodama, Sakura; Masayuki Murakami, Hoya; Tsuneji Kimeda, Yokosuka; Tadahiko Matsuoka, Kawasaki; Osamu Hara, Kodaira; Satoru Tsukiyama, Tokyo, all of Japan

[73] Assignees: Iwasaki Tsushinki Kabushiki Kaisha; Nippon Telegraph and Telephone Public Corporation, both of Japan

[21] Appl. No.: 816,219

[22] Filed: Jul. 15, 1977

[30] Foreign Application Priority Data

Jul. 15, 1976 [JP] Japan .................................. 51-84221
Jul. 15, 1976 [JP] Japan .................................. 51-84222
Jul. 15, 1976 [JP] Japan .............................. 51-94116[U]
Jul. 15, 1976 [JP] Japan .............................. 51-94118[U]
Apr. 7, 1977 [JP] Japan .............................. 52-42540[U]
Apr. 7, 1977 [JP] Japan .............................. 52-42539[U]

[51] Int. Cl.² ........................ H04M 1/30; H04M 1/34
[52] U.S. Cl. .................................................. 179/90 R
[58] Field of Search ........................ 179/90 R, 90 FW

[56] References Cited

U.S. PATENT DOCUMENTS

| 2,920,145 | 1/1960 | Vadas | 179/90 R |
| 2,963,554 | 12/1960 | Hershey | 179/90 R |
| 3,105,122 | 9/1963 | Babb et al. | 179/90 R |
| 3,952,168 | 4/1976 | Barber | 179/90 R |

Primary Examiner—Kathleen H. Claffy
Assistant Examiner—Gerald L. Brigance
Attorney, Agent, or Firm—Robert E. Burns; Emmanuel J. Lobato; Bruce L. Adams

[57] ABSTRACT

A rotary telephone dial, in which at least one shaft is fixedly planted on a base plate. A rotary member is rotatably mounted on the shaft. Another base plate is engaged with the free end of the shaft to support the shaft. One direction assembling can be performed as a result of the above structure. A finger moving compensation mechanism is provided to obtain a sufficent allowable range of finger moving. The spring retaining structure and the governor mechanism are improved to effectively reduce the number of parts and to realize simplification of the manufacturing process.

19 Claims, 23 Drawing Figures

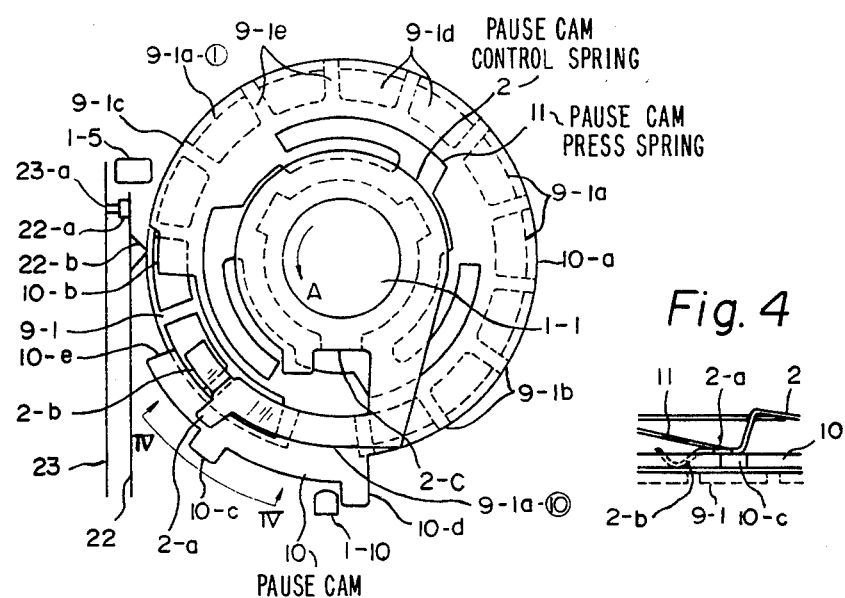
Fig. 3
Fig. 4
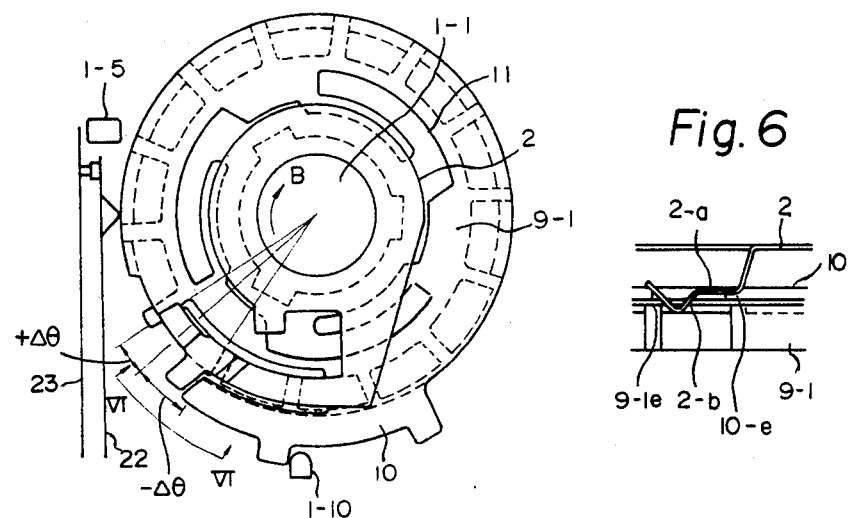
Fig. 5
Fig. 6

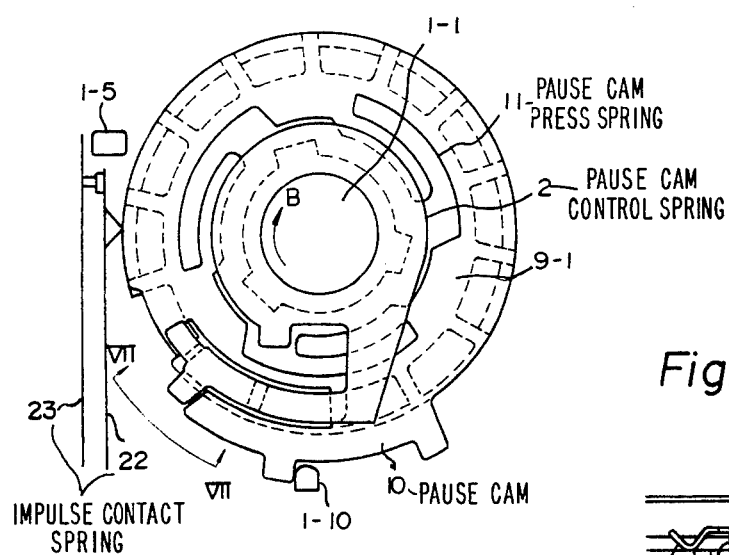
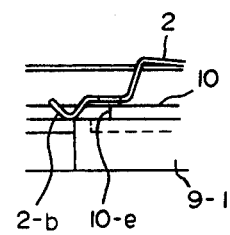
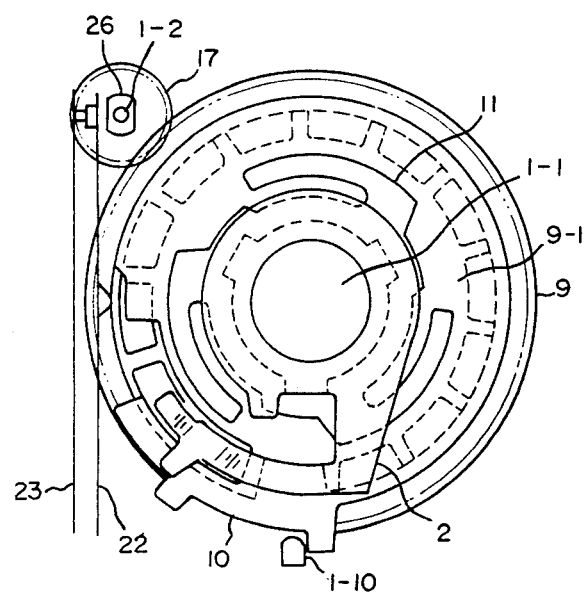

Fig. 18
Fig. 19
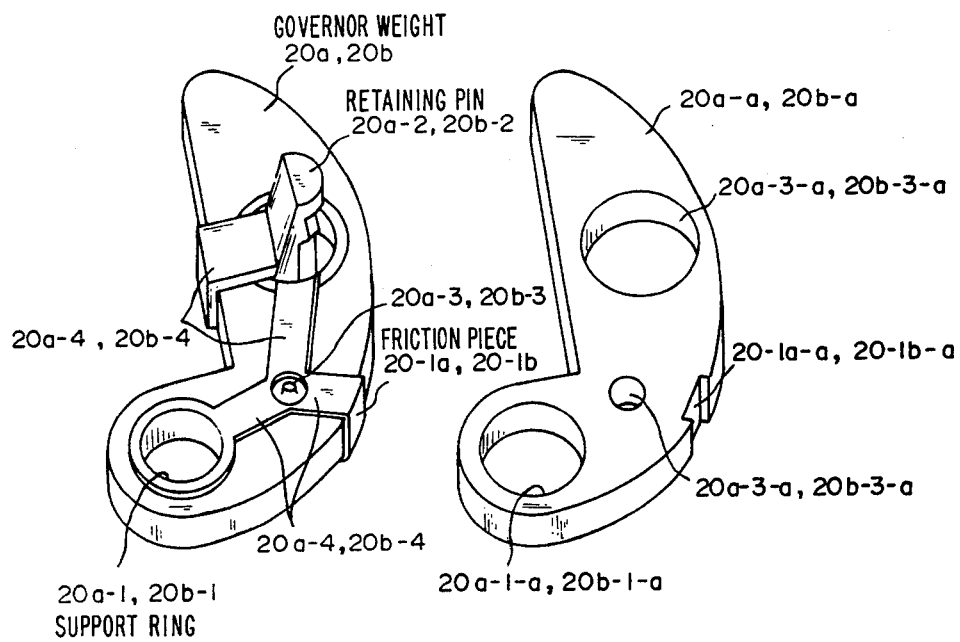
Fig. 20
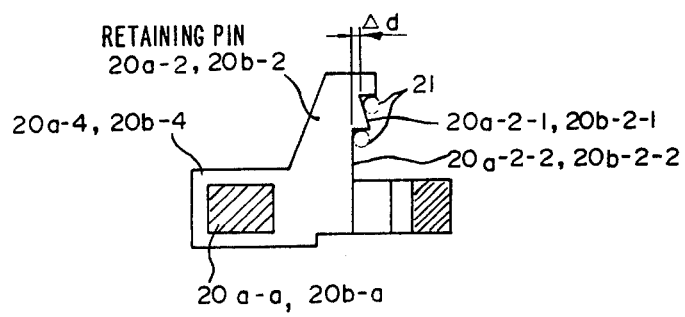

ROTARY TELEPHONE DIAL

BACKGROUND OF THE INVENTION

1. Field of the Invention

This invention relates to a rotary telephone dial.

2. Description of the Prior Art

In conventional rotary dials, shafts including a main shaft to a governor shaft of a rotary system for driving an impulse generating function and a governor function, which are principal functions, are individually provided so that parts are complicatedly assembled and engaged with one another. Accordingly, the number of parts is very large and, of course, the number of assembling steps is also very large. Namely, the construction of the conventional rotary dial requires many assembling steps, such as insertion of rotary shafts of a gear system into predetermined holes, insertion of a shaft carrying element or mounting thereon a sub-assembly of parts into a predetermined hole, providing studs for limiting play and falling of the shafts in the direction of their thrust, etc. Moreover, many screws, rivets, etc. are used in addition to caulking at many places to fix parts, so that the conventional rotary dials cannot easily be assembled and require large-scale production equipment.

Further, the allowable angular range of a finger moving operation for generating normal dial pulses is about 4° (½ of ⅓ of fourteen equal divided parts from the outer periphery) at maximum. For example, in a case where the finger moving angle of the dial is insufficient, an impulse cam directly coupled with a finger plate is not sufficiently rotated, so that the length of the first break pulse is reduced. Conversely, in case of an excessive finger moving angle, the impulse cam is excessively rotated to produce a pseudo-pulse in some cases. This generates incorrect pulses to cause an erroneous switching, which is a fatal defect of the dial function. Further, since the allowable angular range of the finger moving operation is narrow, high accuracy is required of the parts and assembling.

Moreover, a spring retaining structure in the conventional rotary dial is of the type in which required contact springs and insulating plates are alternately placed one on another and fixed to a frame. Each clamping screw for fixing them is usually inserted through an insulating tube to provide insulation between the contact springs. This kind of contact spring retaining structure involves a large number of assembling steps. Moreover, an increase in the number of contact circuit springs increases the number of insulating plates for insulating the contact springs from each other and requires to change the length of the insulating tube coupling screw. With such a structure, if the telephone set is installed at a dry place, coupling becomes loose due to shrinkage of the insulating plate to introduce the possibility of an erroneous operation of the contact spring. Conversely, at a place of high humidity, the insulating plate expands to break down the coupling screw.

Further, in a governor mechanism of the conventional rotary dial, a flying bar is mounted in a cylindrical governor cup closed at one end and two opposing governor weights are disposed on the upper surface of the flying bar. In this case, these governor weights are rotatably supported by inserting support pins into holes of support portions at both ends of each governor weight and fitting the top ends of the pins into holes of the flying bar. A governor spring is retained at one end to a retaining pin disposed on one of the governor weights and at the other end to a retaining pin on the other governor weight, thereby to provide the function which prevents by resiliency of the governor spring a phenomenon that, during dial free moving, the governor weights are rotated to be spread too far from their support pins due to the centrifugal forces, in other words, the governor weights are positioned in a normally spaced relationship relative to each other. With such a construction, however, assembling includes caulking of the support pins to the flying bar, and oiling between the apertures and the support pins, and hence is troublesome. If the support pins are caulked too much, there is the possibility of such a trouble that the governor weights do not rotate smoothly.

Moreover, in such a construction, when resiliency of a governor spring is required to be changed for adjustment of the rotational speed, the governor spring must be replaced by another one. Moreover, in such a construction, it is necessary to assemble a friction piece and a retaining pin with the governor weight by pressing or caulking. Further, positioning accuracy is required of a support ring, the friction piece and the retaining pin of the governor weight, and the friction piece and the retaining pin are opposite in the direction of assembling, so that simplification of the manufacture process has been desired.

SUMMARY OF THE INVENTION

An object of this invention is to provide an inexpensive rotary telephone dial which adopts an assembling method using mainly stacking or fitting of parts and facilitates one-direction assembling and which is adapted to perform a plurality of functions by one part to reduce the number of parts used, thereby enabling automation of assembling steps with ease.

Another object of this invention is to provide a rotary telephone dial which has a finger moving compensation mechanism which compensates for an insufficient finger moving operation and an excessive finger moving operation to obtain a sufficient allowable range of finger moving.

Another object of this invention is to provide a rotary telephone dial which has a spring retaining structure designed so that contact springs are each held by insulators having thin tapered edges into which end faces of the contact springs cut.

Another object of this invention is to provide a rotary telephone dial which has an easy-to-assemble governor mechanism in which pivots formed at both ends of a flying bar as a unitary structure therewith are rotatably inserted in apertures formed at support portions of governor weights, respectively, without using caulking.

Another object of this invention is to provide a rotary telephone dial which has a governor mechanism in which a plurality of governor spring engaging parts are provided on governor spring retaining members planted on governor weights, thereby to make exchange of a governor spring unnecessary.

Still another object of this invention is to provide a rotary telephone dial which has a governor mechanism in which, of a friction piece, a retaining pin and a support ring of each governor weight, at least the friction piece is formed on a governor weight blank by molding of a plastic material.

BRIEF DESCRIPTION OF THE DRAWINGS

FIG. 3 is a plan view showing the state of completion of a dial free moving operation of a main gear assembly for use in this invention;

FIG. 4 is a partial side view in the direction indicated by the arrows IV—IV in FIG. 3;

FIG. 5 is a plan view showing the state of completion of a finger moving operation in the case of dialing "1" in the example depicted in FIG. 3;

FIG. 6 is a partial side view in the direction indicated by the arrows VI—VI in FIG. 5;

FIG. 7 is a plan view illustrating the process of free moving from the state of FIG. 5 in the example of FIG. 3;

FIG. 8 is a partial side view in the direction indicated by the arrows VII—VII in FIG. 7;

FIG. 9 is a plan view showing another embodiment of the main gear assembly for use in this invention;

FIG. 18 is a perspective view illustrating another example of a governor weight in the governor assembly for use in this invention;

FIG. 19 is a perspective view showing an example of a blank of the governor weight shown in FIG. 18;

FIGS. 20, 21 and 22 are respectively cross-sectional views illustrating in detail examples of a governor spring retaining members.

DESCRIPTION OF THE PREFERRED EMBODIMENTS

Figure 1:
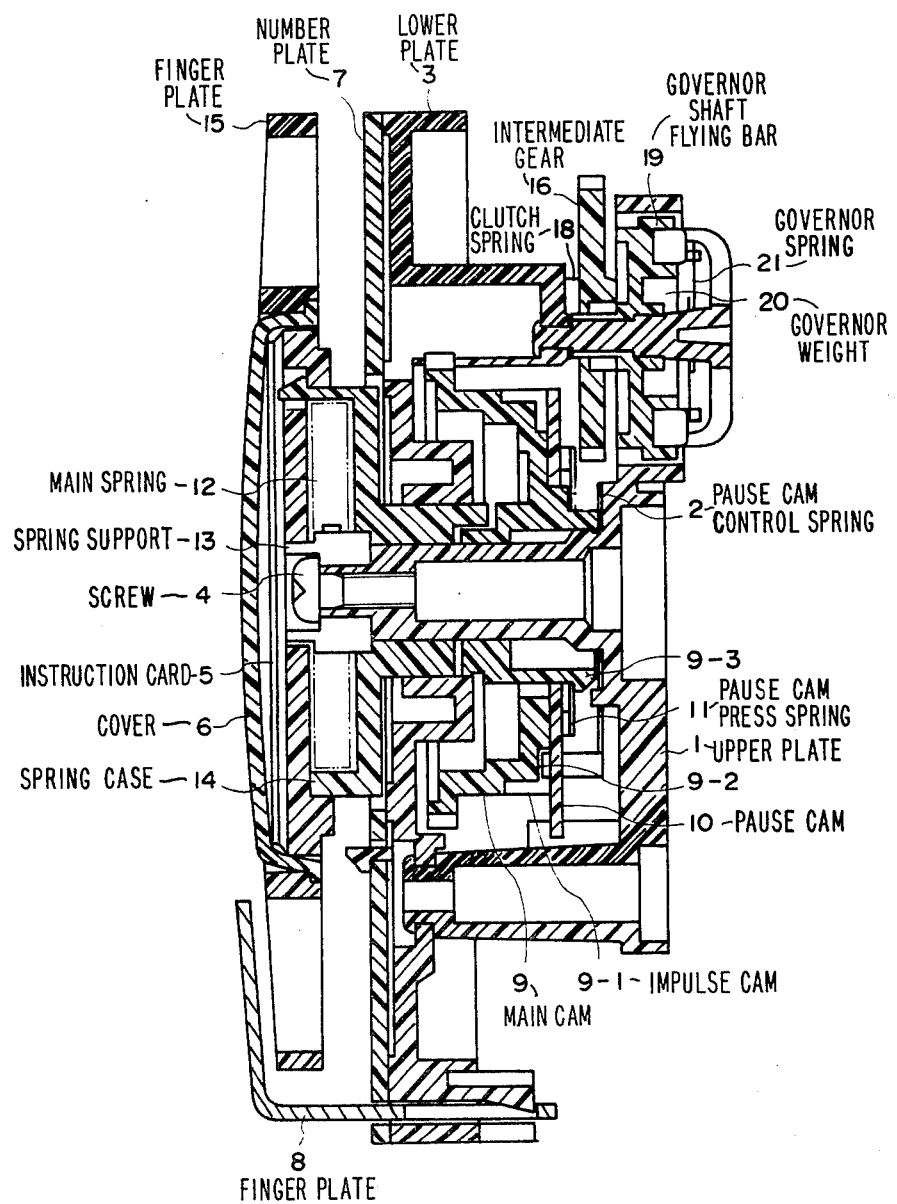
FIG. 1 is a cross-sectional view of an embodiment of this invention.
Figure 2:
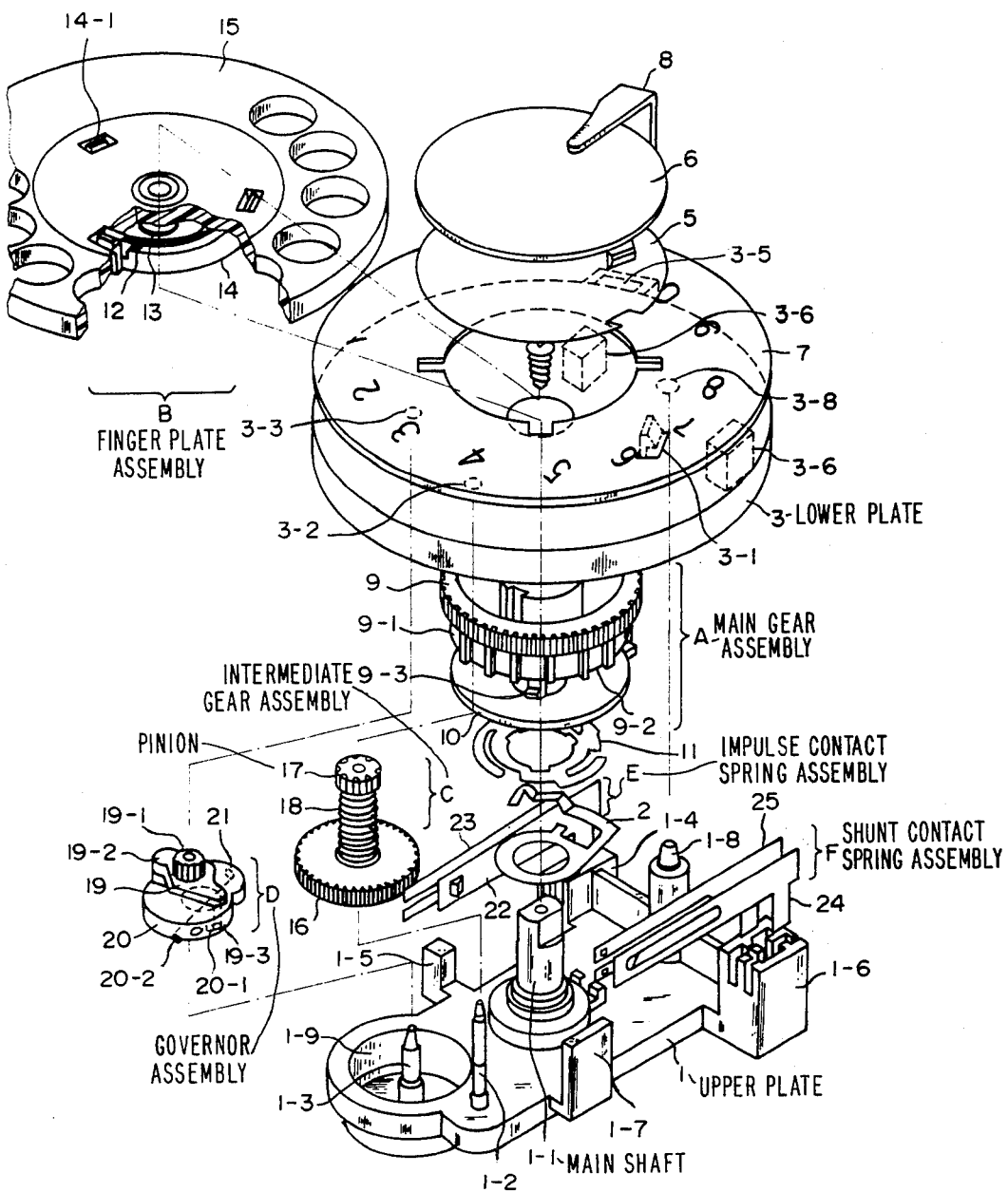
FIG. 2 is an exploded perspective view of the embodiment shown in FIG. 1.

Referring first to FIGS. 1 and 2, an embodiment of this invention will hereinafter be described.

An upper plate 1 is provided with a main shaft 1-1 on which are mounted a pause cam control spring 2, a main gear assembly A and a finger plate assembly B; an intermediate shaft 1-2 on which an intermediate gear assembly C is mounted; a governor shaft 1-3 on which a governor assembly D is mounted; a spring mounting part 1-4 on which an impulse contact spring assembly E is mounted to be positioned in place; a spring positioning member 1-5; a spring mounting part 1-6 on which a shunt contact spring assembly F is mounted to be positioned in place; a spring positioning member 1-7; a stud 1-8 for positioning the upper plate 1 relative to a lower plate 3; and a governor cup 1-9. A screw 4 affixes the finger plate assembly B to the main shaft 1-1 and an instruction card 5 is attached by a cover 6 to the finger plate assembly B. A number plate 7 and a finger stop 8 are firmly engaged with a lug 3-1 and a coupling groove 3-5 of the lower plate 3, respectively. The upper plate 1 and the lower plate 3 are assembed together, with the shafts 1-2 and 1-3, the stud 1-8 and the spring mounting parts 1-4 and 1-6 of the former held in engagement with holes 3-2, 3-3 and 3-8 and spring retainers 3-4 and 3-6 of the latter, respectively.

The main gear assembly A comprises a main gear 9 having an impulse cam 9-1, a groove 9-2 for engagement with the pause cam control spring 2 and a pawl 9-3, a pause cam 10 and the pause cam press spring 11. In this case, the pause cam 10 and the pause cam press spring 11 are held by the pawl 9-3. The finger plate assembly B is composed of a main spring 12, a spring support 13, a spring case 14 housing them and a finger plate 15 held by pawls 14-1 of the spring case 14. The intermediate gear assembly C comprises an intermediate gear 16, a pinion 17 and a clutch spring 18 disposed therebetween. The governor assembly D comprises a governor shaft flying bar 19 composed of a governor pinion 19-1, a flying bar 19-2 and weight pins 19-3 for receiving two governor weights 20, respectively, the two governor weights 20, each having a friction piece 20-1 and a governor spring hook 20-2, and a governor spring 21. The flying bar 19-2 and the weight pins 19-3 are formed by molding them as a unitary structure with each other. The impulse contact spring assembly E comprises a main impulse contact spring 22 and a following impulse contact spring 23. The shunt contact spring assembly F comprises a main shunt contact spring 24 and a following shunt contact spring 25.

Since the rotary telephone dial of this invention has such a construction as described above, the parts of the rotary systems and spring system including from the main gear 9 to the governor pinion 19-1 are placed one on another in one direction and assembled together on the upper plate 1, and then the lower plate 3 is assembled with the upper plate 1 in the opposing relation thereto. The lower plate 3 and the upper plate 1 are fastened to each other by ultrasonic caulking of the shafts 1-2 and 1-3 and the stud 1-8.

Further, only with such an arrangement, for example, in which at least one of the governor shaft 1-3 mounting thereon the governor assembly D and the intermediate shaft 1-2 mounting thereon the intermediate gear C is planted by molding on the upper plate 1 so that the lower plate 3 is supported by the free end of the planted shafts, the number of assembling steps can be remarkedly reduced.

Moreover, it is possible to plant the shafts 1-1, 1-2, 1-3 and 1-8 by molding not only on the upper plate 1 but also on the lower plate 3.

Furthermore, molding is preferred to be the unitary molding using the same material but it is also possible to make the plates of either one of metallic and molding materials and to form the shafts of the other so that the shafts are inserted into holes in the plates.

As described above, the rotary telephone dial of this invention has such a construction that it can be assembled mainly by mounting its parts one on another on a base plate such, for example, as the upper plate 1, or pressing them into holes or the like formed on such a base plate, as described above. Accordingly, this invention simplifies assembling of the rotary telephone dial to facilitate its automatic assembling and enables each part to perform a plurality of functions, so that the number of assembling steps can be remarkably decreased.

Turning next to FIGS. 3 to 9, an example of the main gear assembly A will be described in detail. The outer periphery of the impulse cam 9-1 has recesses 9-1a for emitting dial pulses formed at ten places 9-1a-1 to 9-1a-10 at intervals of one-14th of the periphery, projections 9-1b and a pause time part 9-1c. Further, adjacent to a V-shaped number 2-b of the pause cam control spring 2 for controlling the pause cam 10, flat edge recesses 9-1d and flat edge projections 9-1e are respectively provided at equal pitches of one-14th of the periphery, as is the case with the recesses 9-1a and the projections 9-1b mentioned above. The pause cam 10 has a circular arc part 10-a, which is substantially identical with the pause time part 9-1c of the impulse cam 9-1, a depresion 10-d and projections 10-c and 10-d for engagement with a stopper 1-10 to define the range of rotational movement of the pause cam 10. Moreover, the pause cam 10 has projections 10-e for engagement with a control piece 2-a of the pause cam control spring (i.e. a pause cam control member) 2. The pause cam control spring 2 is also provided with the aforementioned V-shaped part 2-b for engagement with the flat recesses 9-1d and the projections 9-1e of the impulse cam 9-1 in addition to the abovesaid control piece 2-a. The spring 11 serves to press the pause cam 10 against the impulse cam 9-1. To the main shaft 1-1 are directly coupled the finger plate 15 (Refer to FIG. 2) and the impulse cam 9-1, and the pause cam 10 is mounted on the main shaft 1-1 in a manner to be rotatable thereabout. The pause cam control spring 2 is mounted on the main shaft 1-1 but is not rotatable because a U-shaped depression 2-c is engaged with the upper plate 1 (Refer to FIG. 2). The spring 11 is assembled with the impulse cam 9-1 in a manner to be rotatable therewith. The impulse contact spring 22 has a contact 22-a and a V-shaped member 22-b for engagement with the outer peripheries of the impulse cam 9-1 and the pause cam 10. The impulse contact spring 23 has a contact 23-a which pairs with the contact 22-a of the impulse contact spring 22. The spring positioning member 1-5 is to limit the flexural displacement of the impulse contact spring 23.

The above has described the parts of the main gear assembly A. Now, its operation will be described. FIG. 5 shows the state in which, for instance, a dial operation of "1" has been normally performed by finger moving (in the direction of an arrow A in FIG. 3) from the state of FIG. 3 prior to the dial finger moving, that is, the state of completion of the free moving operation.

When the finger plate 15 is released from the state shown in FIG. 5, the impulse cam 9-1 rotates in the direction of an arrow B due to the torque of the main spring 12 turned by the finger moving operation. At this time, the pause cam 10, which is pressed by the spring 11 against the impulse cam 9-1, tends to rotate with the impulse cam 9-1 due to friction, but since the control piece 2-a of the pause cam control spring 2 is in engagement with the projection 10-e of the pause cam 10 as shown in FIG. 6, the pause cam 10 does not rotate but remains at a standstill. Accordingly, at the early stage of the free moving operation, the impulse cam 9-1 independently rotates but when one of the projections 9-1e strikes against the V-shaped member 2-b of the pause cam control spring 2 to push up the V-shaped member 2-b, the control piece 2-a shown in FIG. 6 disengages from the projection 10-e, permitting the pause cam 10 to rotate together with the impulse cam 9-1. The relative positions of the respective parts are shown in FIG. 7. As the rotation proceeds in the state depicted in FIG. 7, the V-shaped member 22-b of the impulse spring 22 falls in the depression 10-b of the pause cam 10 to disengage the contacts 22-a and 22-b from each other, thus emitting a break pulse. When the projection 10-d of the pause cam 10 has run against the stopper 1-10, the pause cam 10 comes to the rest state and only the impulse cam 9-1 continues further rotation while the pause time part 9-1c pushes up the V-shaped member 22-b to engage the contacts 22-a and 23-a with each other to stop emission of one break pulse, thus completing the free moving operation and being restored to the state of FIG. 3.

With the above arrangement, the amount of correction for insufficient finger moving was a value of $-\Delta\theta \approx 8°$ ($\frac{1}{3}$ of $\frac{2}{3}$ of a break pulse portion which is 1/14 of 360°) in FIG. 5, and the amount of correction for excessive finger moving was a value of $+\Delta\theta \approx 8°$.

The above has described the example in which the main shaft 1-1 has the dial pulse emitting function. However, the abovesaid function can also be obtained with such an arrangement as illustrated in FIG. 9 in which the dial pulse emitting function is performed by a second shaft 1-2 so that the impulse spring 22 is driven by rotating the impulse cam 9-1 by the main gear 9 through the pinion 17, the impulse cam 9-1 being mounted on the second shaft 1-2.

In the above example, the V-shaped member 2-b of the pause cam control spring 2 is pushed up by the flat edge projection 9-1e of the impulse cam 9-1 to control the control piece 2-a in a direction parallel to the main shaft 1-1. It is also possible, however, to employ such a pause cam control mechanism in which the control piece 2-a is controlled in a direction perpendicular to the main shaft 1-1 and is controlled by the impulse generating projection 9-1b and recess 9-1a of the impulse cam 9-1.

As described above, although an allowable range of the finger moving angle in the conventional rotary dial is $+\Delta\theta \approx 4°$ at maximum, the allowable range in the present invention is twice ($+\Delta\theta \approx 8°$) the above value. Accordingly, this invention ensures to eliminate the possibility of incorrect pulse generation experienced in the prior art and allows ease in the manufacture.

Next, a detailed description will be given of an example of the impulse contact spring assembly E and the shunt contact spring assembly F.

Figure 10:
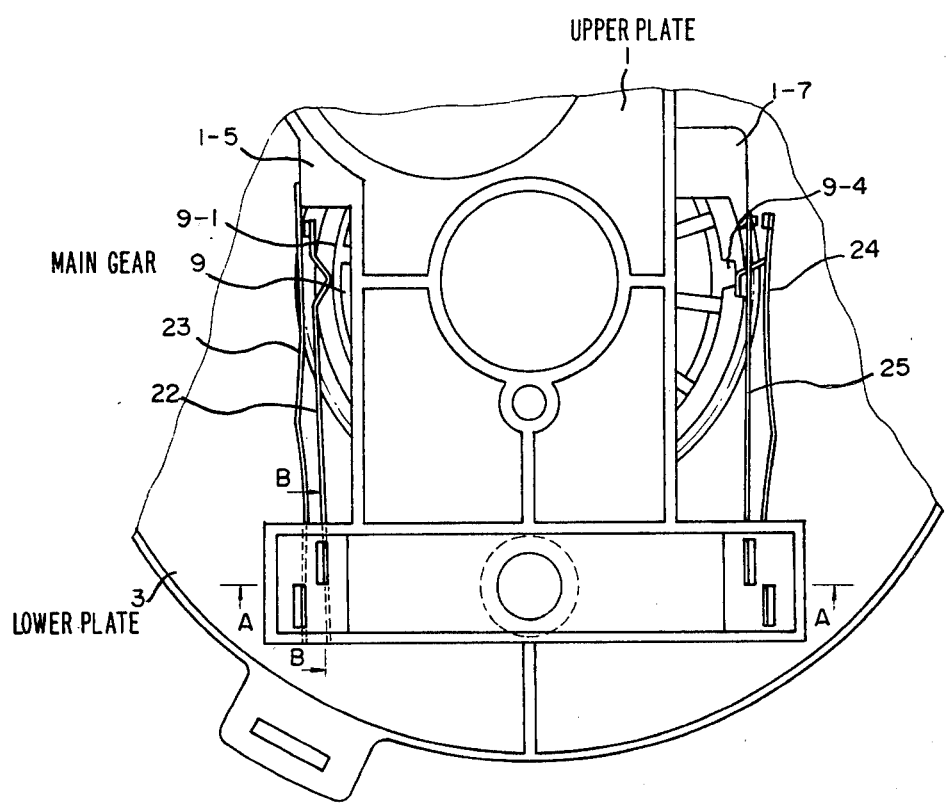
FIG. 10 is a plan view of a part of the rotary dial of this invention showing the state in which a spring retaining structure is incorporated.
Figure 11:
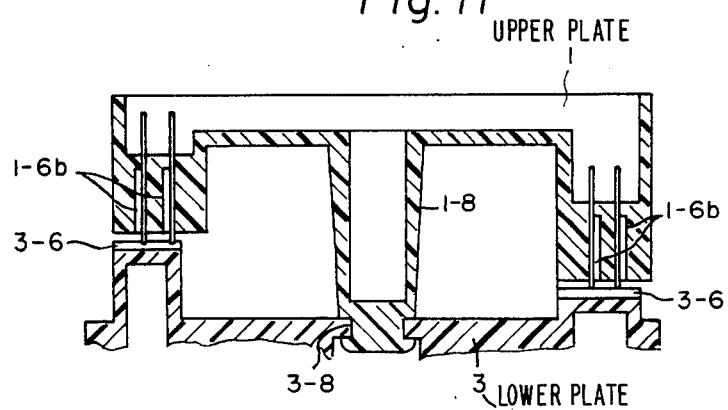
FIG. 11 is a cross-sectional view taken along the line A—A in FIG. 10.
Figure 12:
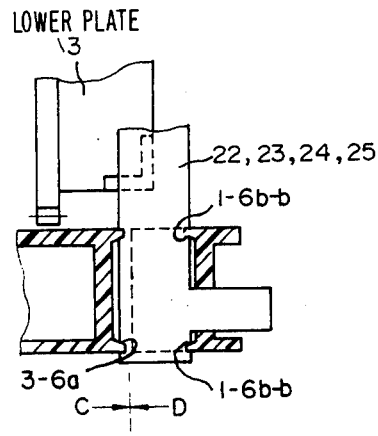
FIG. 12 is a cross-sectional view taken along the line B—B in FIG. 10.
Figure 13:
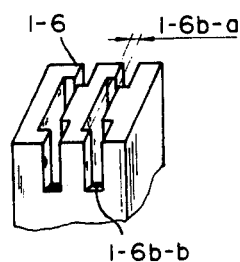
FIG. 13 is a perspective view in the direction of the arrow C in FIG. 12.
Figure 14:
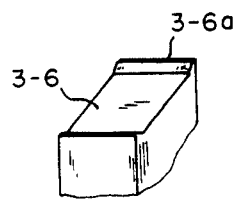
FIG. 14 ia a perspective view in the direction of the arrow D in FIG. 14.

FIG. 10 is a plan view illustrating the principal part of an example of the rotary telephone dial having a spring holding structure according to this invention. FIGS. 11 and 12 are cross-sectional views taken along the lines A—A and B—B in FIG. 10, respectively. FIGS. 13 and 14 are perspective views in the directions C and D in FIG. 12. In FIGS. 10 to 14, the stud 1-8 of the upper plate 1 is caulked to the hole 3-8 of the lower plate 3 (The upper plate 1 and the lower plate 3 are joined to each other by caulking at three places, though not shown.) and contact springs 22, 23, 24 and 25 are held by the contact spring retainers 3-4 and 3-6 of the lower plate 3. The top end portions of the contact springs 22, 23, 24 and 25 are respectively positioned at the contact spring positioning members 1-5 and 1-7 on the upper plate 1 and the impulse cam 9-1 which is formed as one body with the main gear 9 and the shunt cam 9-4. By the dial rotating operation of the main gear 9, predetermined contact-opening and closing operations are achieved.

With reference to FIGS. 12, 13 and 14, the spring holding structure using contact springs will be described. The contact spring receiving groove 1-6b of the upper plate 1 has such a configuration as shown in FIG. 13 for the purpose of elongated lifetime of a mold and preventing the contact springs from faling. The bottom of a groove 1-6b-a receiving each of the contact springs 22, 23, 24 and 25 has thin tapered edges 1-6b-b on both sides. The spring retainer 3-6 of the lower plate 3 has only a thin tapered edge 3-6a since the contact springs 22, 23, 24 and 25 are already positioned by the contact spring receiving grooves 1-6b of the upper plate 1. When the contact springs 22, 23, 24 and 25 are held by the thin tapered edges 1-6b-b and 3-6a, since the contact springs 22, 23, 24 and 25 are thin and hence sharp, they cut into the soft thin tapered edges 1-6b-b and 3-6a formed of a plastic material.

With such an arrangement, the contact spring receiving groove 1-6b of the upper plate 1 has such a configuration as shown in FIG. 13, which is a wide groove having a U-shaped part at its intermediate portion, for the sake of convenience in molding. The width of the groove 1-6b-a is selected so that each of the contact springs 22, 23, 24 and 25 may be inserted thereinto without fluctuation of the directions thereof. Accordingly, when the upper plate 1 and the lower plate 3 are assembled together, the contact springs 22, 23, 24 and 25 are each inserted into the groove 1-6b-a and their tips cut into the thin tapered edges 1-6b-b, so that a groove corresponding to the thickness of each of the contact springs 22, 23, 24 and 25 is formed in each thin tapered edge 1-6b-b. A similar groove is also formed in the thin tapered edge 3-6a of the lower plate 3, so that even if the width of the groove 1-6b and the thickness of each of the contact springs 22, 23, 24 and 25 are appreciably different from each other, the contact spring is accurately positioned by the groove 1-6b-a and the above-said groove newly formed in the thin tapered edges 1-6b-b and 3-6a. Further, the upper and lower plates 1 and 3 are coupled together by caulking of the stud 1-8, but dispersion in sizes such as the depths of the contact spring receiving grooves 1-6b and the heights of the contact retainers 3-6 and 3-6 is compensated for by cutting the contact springs 22, 23, 24 and 25 into the thin tapered edges 1-6b-b and 3-6a.

According to this invention, if the spring receiving grooves and the spring retainers are formed integrally with the upper and lower plates, respectively, as described above, the numbers of parts and assembling steps can be remarkedly reduced, and a highly accurate spring assembly which is hardly affected by the surrounding conditions can be obtained.

Next, a specific operative example of the governor assembly for use in this invention will be described in more detail.

Figure 15:
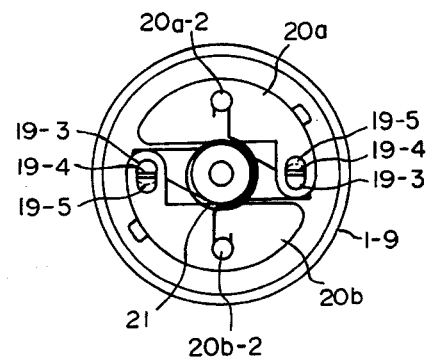
FIG. 15 is a plan view illustrating an example of a governor assembly for use in this invention.
Figure 16:
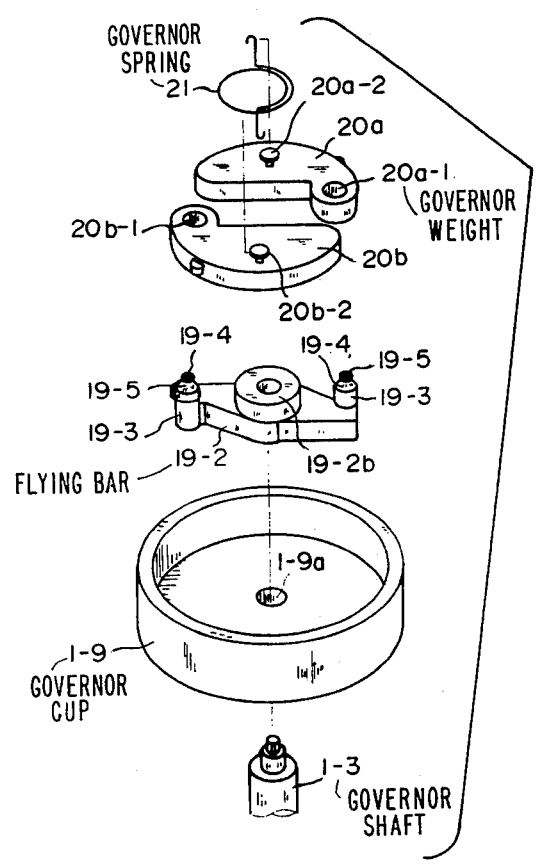
FIG. 16 is an exploded perspective view of the example of FIG. 15.
Figure 17:
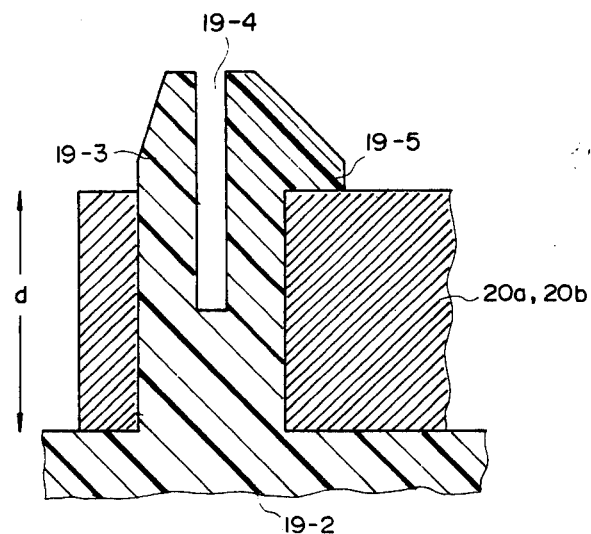
FIG. 17 is an enlarged cross-sectional view of a part of the left side of the example shown in FIG. 15.

In FIGS. 15 and 16, the flying bar 19-2 is fixedly mounted in the governor cup 1-9, so that the top end portion of the governor shaft 1-3 is pressed into a hole 19-2b of the flying bar 19-2 through a hole 1-9a of the governor cup 1-9. On upper surfaces of both end portions of the flying bar 19-2, there are disposed cylindrical weight pins 19-3 formed integrally with the flying bar 19-2. Each of the weight pins 19-3 has slits 19-4 extending from its tip in its axial direction. On the outsides of the plurality of portions divided by the slits 19-4, round projections 19-5 are respectively provided for retaining the governor weights 20a and 20b in the state in which the weight pins 19-3 are inserted in engaging holes 20a-1 and 20b-1 of the governor weights 20a and 20b. Between the lower ends of the projections 19-5 and the upper surfaces of the flying bar 19-2, there are respectively formed a spacing substantially equal to the thickness of each of the governor weights 20a and 20b (Refer to FIG. 17). Further, it is preferred that the projections 19-5 are disposed on the side of the governor weights 20a and 20b, that is, in the state of FIG. 15, the projection 19-5 on the right-hand weight pin 19-3 is disposed on the upper side of the pin and the projection 19-5 on the left-hand weight pin 19-3 is disposed on the lower side of the pin, so that when the governor weights 20a and 20b rotatably mounted on the pins 19-3 are actuated about the weight pins, respectively, the governor weights 20a and 20b are held perpendicularly to the weight pins 19-3 to minimize the so-called play. Of course, the projection 19-5 may also be provided on the outside of the top of each of the plurality of divided portions.

During assembling, when the slit top end portion of the weight pin 19-3 of the flying bar 19-2 is pressed into each of the engaging holes 20a-1 and 20b-1 of the governor weights 20a and 20b, since the weight pin 19-3 is a spring molding, the split parts of the top end portion of the weight pin 19-3 are pressed towards the slit 19-4 to permit the pin to be fitted into the engaging hole 20a-1 or 20b-1. Once the weight pin 19-3 has thun been pressed into the engaging hole 20a-1 or 20b-1, the projection 19-5 of the weight pin 19-3 restores to its initial size, so that the governor weights 20a and 20b are each prevented by the projection 19-5 from coming off the flying bar 19-2 and, at the same time, rotatably supported by the lower parts of the projection 19-5. In the assembling, the flying bar 19-2 having mounted thereon the governor weights 20a and 20b, as described above, is mounted in the governor cup 1-9 in the manner described previously.

Since the governor spring 21 is identical with those employed in the prior art, no description will be given.

The flying bar 19-2 can be easily manufactured by molding a synthetic resinous material such as plastics. Further, it is evident that the governor weights 20a and 20b may also be formed by die casting techniques as unitary structures with engaging pins 20a-2 and 20b-2, respectively.

As is apparent from the above, the governor assembly for use in this invention has the following advantages:

(1) Sincle no caulking of support pins is required, the assembling operation is easy.

(2l) The number of parts used can be reduced.

(3) Since any parts are not caulked, there is no fear of incorrect or insufficient rotational movement of the governor weights.

(4) Since the flying bar is formed by molding a synthetic resinous material, no oiling step is needed.

Another example of the governor assembly for use in this invention will hereunder be described.

FIG. 18 shows an example of the governor weight. In the governor weight 20a (20b), a friction piece 20-1a (20-1b), a retaining pin 20a-2 (20b-2) and a support ring 20a-1 (20b-1) are formed by molding a synthetic resin as a unitary structure with one another to extend from a gate 20a-3 (20b-3) through coupling parts 20a-4 (20b-4). FIG. 19 is a diagram showing the configuration of a governor weight blank before molding. The governor weight blank 20a-a (20b-a) has a groove 20-1a-a (20-1b-a) at the position of the friction piece 20-1a (20-1b), that is, at the surface contacting with the inner wall of the governor cup 1-9, an aperture 20a-3-a (20b-3-a) at the position of the retaining pin 20a-2 (20b-2) serving as a retaining member, an aperture 20a-1-a (20b-1-a) at the position of the support ring 20a-1 (20b-1), and an aperture 20a-3-a (20b-3-a) at the position of the gate 20a-3 (20b-3). The abovesaid friction piece 20-1a (20-1b), retaining pin 20a-2 (20b-2), support ring 20a-1 (20b-1) and gate 20a-3 (20b-3) are shaped so that they can be accurately molded as one body with the governor weight blank 20a-a (20b-a). That is, the friction piece 20-1a (20-1b) is disposed in the groove 20-1a-a (20-1b-a), and fixed by band-shaped portions 20a-4 (20b-4) and 20a-3 (20b-3) extending on the blank 20a-a (20b-a). Since the governor weight blank 20a-a (20b-a) has such a configuration as described above, working necessary therefor is only a flat press work. The friction piece 20-1a (20-1b), the retaining pin 20a-1 (20b-2) and the support ring 20a-1 (20b-1) are formed by molding a plastic material on the governor weight blank 20a-a (20b-a), so that the accuracy of their positioning is determined by the metal mold used to provide for enhanced accuracy. Accordingly, a stable governor characteristic can be expected.

FIG. 20 illustrates an example of the configuration of the retaining pin 20a-2 (20b-2), which has retaining pin grooves 20a-2-1 (20b-2-1) and 20a-2-2 (20b-2-2) formed to have a difference in level therebetween as indicated by Δd so as to permit adjustment of the tensile force of the governor spring 21. The retaining pin groove 20a2-1 (20b-2-1) is inversely sloped so that the governor spring 21 may not be moved down into the retaining pin groove 20a-2-2 (20b-2-2) due to a shock or a vibration. The governor spring 21 is usually engaged with the retaining pin grooves 20a-2-1 (20b-2-1) and 20b-2-2 (20a-2-2). When the dial speed is high, the tensile force of the governor spring 21 is lessened by engaging it with the retaining pin grooves 20a-2-2 and 20b-2-2. Conversely, when the dial speed is low, the tensile force of the governor spring 21 is increased by engaging it with the retaining pin grooves 20a-2-1 and 20b-2-1. Since the dial speed can be adjusted only by changing the position of engagement of the governor spring 21 with the retaining pin, 20a-2 (20b-2), as described above, there is no need of preparing a spare governor spring of a smaller or larger tensile force, and exchange of the governor spring is also unnecessary.

Figure 21:
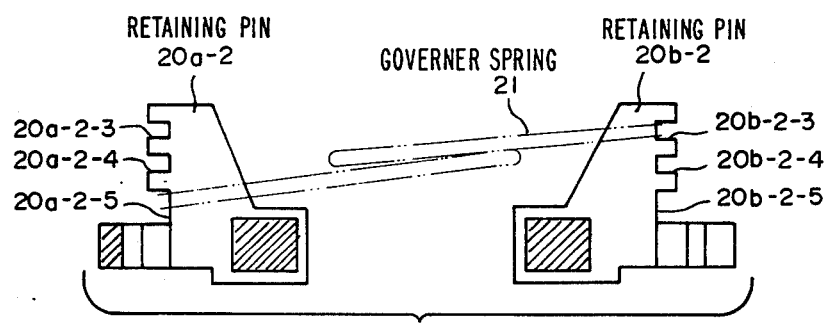

FIG. 21 shows another example of the retaining pin which does not employ such a difference in level between the retaining pin grooves as shown in FIG. 20. In FIG. 21, the retaining pins 20a-2 and 20b-2 have formed therein recesses 20a-2-3, 20a-2-4 and 20a-2-5 and 20b-2-3, 20b-2-4 and 20b-2-5, respectively, in such a manner that the governor spring 21 stretched between the retaining pins can be engaged with the recesses as desired so as to adjust the tensile force. With such arrangement, the same results obtainable with the abovesaid structures can also be obtained. For instance, when one end of the governor spring 21 is retained in the recess 20a-2-5 of the retaining pin 20a-2, the dial speed can be altered by switching the other end of the governor spring 21 to the recess 20a-2-3, 20b-2-4 or 20b-2-5.

Figure 22:
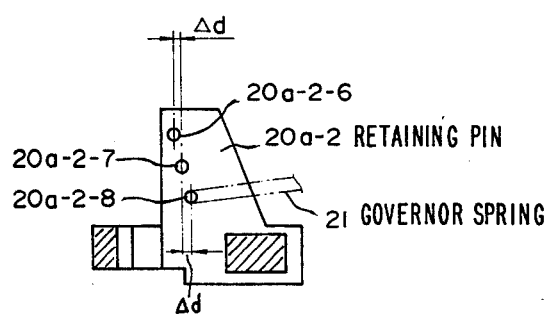

FIG. 22 illustrates another example of the retaining pin which has formed therein apertures 20a-2-6, 20a-2-7 and 20a-2-8 for retaining one end of the governor spring 21. In this case, a difference in level may also be provided between adjacent ones of the apertures.

As described above, the use of the governor mechanism of the rotary telephone dial of this invention permits of simplification of adjustment of the dial speed.

Figure 23:
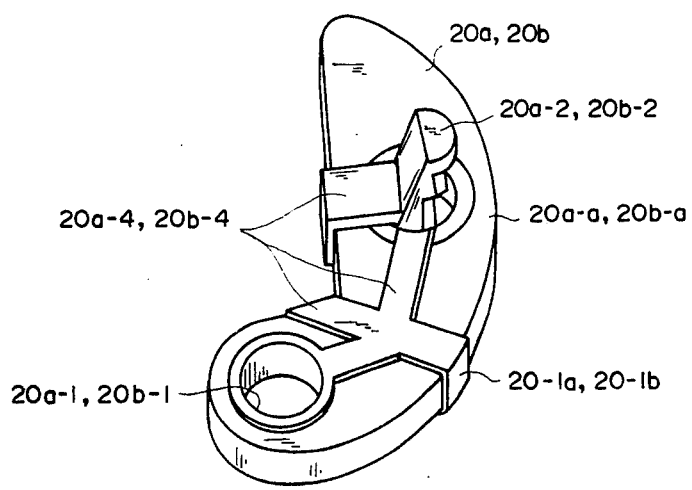
FIG. 23 is a perspective view showing another example of the governor weight of another governor assembly for use in this invention.

Further, the synthetic resin structure of the friction piece 20-1-a (20-1b) and the coupling portion 20a-4 (20b-4) need not always be inserted into the aperture 20a-3-a (20b-3-a) as shown in FIG. 18 but may also be disposed to extend across the governor weight blank 20a-a (20b-a), as indicated by the broken lines in FIG. 23.

In FIG. 18, the coupling portions 20a-4 (20b-4) between the gate 20a-3 (20b-3) and the retaining pin 20a-2 (20b-2) and between the gate 20a-3 (20b-3) and the support ring 20a-1 (20b-1) may be omitted.

As has been described in the foregoing, according to this invention, the governor weight is produced by forming necessary parts on the governor weight blank by molding a plastic material. Accordingly, this invention enables reduction of number of parts used and facilitates the manufacture and, further, simplifies adjustment of the dial speed.

What we claim is:

1. A rotary telephone dial comprising:
   a molded base plate having at least one shaft portion extending therefrom, wherein said base plate having said shaft portion is a one piece unitary structure rotary member rotatably mounted on the shaft;
   a finger wheel for rotating the rotary member, the wheel having a plurality of finger holes by means of which it may be rotated from a rest position through arcs of various lengths by the insertion therein of a finger of the dial user and the moving of the finger in an arcuate path;
   a finger stop projecting into the arcuate path traversed by the finger of the dial user for stopping the finger from rotating the wheel beyond the stop; and
   another base plate engaged with the free end of the shaft and supported by the shaft.

2. A rotary telephone dial according to claim 1, wherein the base plate is an upper plate, and wherein said another base plate is a lower plate.

3. A rotary telephone dial according to claim 1, wherein said at least one shaft includes a governor shaft and an intermediate shaft provided intermediate between the governor shaft and a driving system therefor, an intermediate gear assembly rotatably mounted on the intermediate shaft, and a governor assembly rotatably mounted on the governor shaft.

4. In a rotary telephone dial comprising:
   a base plate;
   at least one shaft fixedly mounted on the base plate;
   rotary member including a pause cam and an impulse cam rotatably mounted on the shaft,
   a finger wheel for rotating the rotary member, the wheel having a plurality of finger holes by means of which it may be rotated from a rest position through arcs of various lengths by the insertion therein of a finger of the dial user and the moving of the finger in an arcuate path;
   a finger stop projecting into the arcuate path traversed by the finger of the dial user for stopping the finger from rotating the wheel beyond the stop; and
   another base plate engaged with the free end of the shaft and supported by the shaft;
   the improvement comprising;
   a pause cam control member, the pause cam control member engaging with the pause cam to temporarily delay the start of its rotation in a free moving direction opposite the direction of finger movement when the pause cam has stopped after rotating through the rotational angular range corresponding to a required pause time in synthronism with the rotation of the impulse cam in the direction of finger movement, and a member for rotating the impulse cam to provide a control function for controlling the pause cam control member so that when the impulse cam moves to the position of making an impulse contact, the pause cam is released from the temporary delay to start rotation.

5. A rotary telephone dial according to claim 4, wherein the control function is performed by pulse generating projections of the impulse cam.

6. A rotary telephone dial according to claim 4, wherein the control function is performed by control projections formed as a unitary structure with the impulse cam separately from the pulse generating projection.

7. A rotary telephone dial according to claim 4, wherein the control function is performed by projections of another member provided separately from the impulse cam but interlocking therewith.

8. A rotary telephone dial according to claim 4, wherein the pause cam control member has a projection which falls into a recess of the pause cam when the pause cam stops and is brought out of the recess by the control function.

9. A rotary telephone dial comprising:
a base plate;
at least one shaft fixedly mounted on the base plate;
rotary member rotatably mounted on the shaft;
a finger wheel for rotating the rotary member, the wheel having a plurality of finger holes by means of which it may be rotated from a rest position through arcs of various lengths by the insertion therein of a finger of the dial user and the moving of the finger in an arcuate path;
a finger stop projecting into the arcuate path traversed by the finger of the dial user for stopping the finger from rotating the wheel beyond the stop;
another base plate engaged with the free end of the shaft and supported by the shaft; and
a spring retaining structure including a spring retaining member having a spring receiving groove and a spring receiver respectively disposed on said base plate and said another plate;
the improvement comprising; thin tapered edges of an insulating material formed on at least one of the spring retaining member and the spring receiver in a direction crossing the spring, the spring being pressed against the thin tapered edges and held in the spring receiving groove.

10. A rotary telephone dial comprising:
a base plate;
at least one shaft fixedly mounted on the base plate;
rotary member rotatably mounted on the shaft;
a finger wheel for rotating the rotary member, the wheel having a plurality of finger holes by means of which it may be rotated from a rest position through arcs of various lengths by the insertion therein of a finger of the dial user and the moving of the finger in an arcuate path;
a finger stop projecting into the arcuate path traversed by the finger of the dial user for stopping the finger from rotating the wheel beyond the stop; and another base plate engaged with the free end of the shaft and supported by the shaft;
the improvement comprising: a governor assembly mounted on said base plate and having a governor cup, a flying bar mounted therein and a plurality of governor weights, each of which is pivotally mounted at one end to the flying bar at its one end portion and retaining a governor spring at a predetermined position, shafts for supporting the governor weights formed at both ends of the flying bar integrally therewith, a slit formed in the free end portion of each of the shafts, and a governor weight retaining projection formed on the outside of at least one of the divided portions of each shaft for preventing the governor weight from coming off the shaft.

11. A rotary telephone dial comprising:
a base plate;
at least one shaft fixedly mounted on the base plate;
rotary member rotatably mounted on the shaft;
a finger wheel for rotating the rotary member, the wheel having a plurality of finger holes by means of which it may be rotated from a rest position through arcs of various lengths by the insertion therein of a finger of the dial user and the moving of the finger in an arcuate path;
a finger stop projecting into the arcuate path traversed by the finger of the dial user for stopping the finger from rotating the wheel beyond the stop; and
another base plate engaged with the free end of the shaft and supported by the shaft;
the improvement comprising a governor assembly having a governor cup, a flying bar rotatably mounted therein for rotating about the central axis of the governor cup, a pair of governor weights respectively pivotally mounted at one end to the flying bar at both its end portions and a governor spring retained at both ends to the pair of governor weights at their predetermined positions, governor spring retaining members respectively mounted on the governor weights at said predetermined positions, respectively, and each having a plurality of governor spring retaining parts.

12. A rotary telephone dial according to claim 11, wherein the governor spring retaining members are each formed by a member of a plastic material formed on a governor weight blank.

13. A rotary telephone dial according to claim 11, wherein a difference in level is formed between adjacent ones of the plurality of governor spring retaining parts.

14. A rotary telephone dial according to claim 11, wherein the governor spring retaining parts are recesses.

15. A rotary telephone dial according to claim 11, wherein the governor spring retaining parts are holes.

16. A rotary telephone dial comprising:
a base plate;
at least one shaft fixedly mounted on the base plate;
rotary member rotatably mounted on the shaft;
a finger wheel for rotating the rotary member, the wheel having a plurality of finger holes by means of which it may be rotated from a rest position through arcs of various lengths by the insertion therein of a finger of the dial user and the moving of the finger in an arcuate path;

a finger stop projecting into the arcuate path traversed by the finger of the dial user for stopping the finger from rotating the wheel beyond the stop; and another base plate engaged with the free end of the shaft and supported by the shaft;

the improvement comprising: a governor assembly having a governor cup, a flying bar rotatably mounted therein for rotating about the central axis of the governor cup, a pair of governor weights respectively pivotally mounted at one end to the flying bar at its both end portions and a governor spring retained at both ends to the pair of governor weights at their predetermined positions, a blank of each of the governor weights having a groove formed in its surface engaging the inner wall of the governor cup, and a friction piece formed by a band-shaped member of a synthetic resinous material to extend from the groove along with upper and lower surfaces of the governor weight blank.

17. A rotary telephone dial according to claim 16, wherein each governor weight blank has an aperture formed at its central portion corresponding to the groove, and wherein the band-shaped member of the synthetic resinous material is disposed to pass through the aperture.

18. A rotary telephone dial according to claim 16, wherein the band-shaped member of the synthetic resinous material is mounted on each governor weight blank to extend along the entire periphery thereof.

19. A rotary telephone dial according to claim 16, wherein the band-shaped member of the synthetic resinous material is formed as a unitary structure with a governor spring retaining pin.

* * * * *